(12) United States Patent
Adachi

(10) Patent No.: US 10,390,207 B2
(45) Date of Patent: Aug. 20, 2019

(54) USER TERMINAL AND CONTROL METHOD

(71) Applicant: KYOCERA CORPORATION, Kyoto (JP)

(72) Inventor: Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 10 days.

(21) Appl. No.: 15/564,223

(22) PCT Filed: Apr. 7, 2016

(86) PCT No.: PCT/JP2016/061436
§ 371 (c)(1),
(2) Date: Oct. 4, 2017

(87) PCT Pub. No.: WO2016/163476
PCT Pub. Date: Oct. 13, 2016

(65) Prior Publication Data
US 2018/0132091 A1    May 10, 2018

(30) Foreign Application Priority Data
Apr. 10, 2015  (JP) ................ 2015-081202

(51) Int. Cl.
H04W 8/00      (2009.01)
H04W 72/02     (2009.01)
H04W 92/18     (2009.01)
H04W 72/04     (2009.01)
H04L 29/12     (2006.01)

(52) U.S. Cl.
CPC .......... *H04W 8/005* (2013.01); *H04W 72/02* (2013.01); *H04W 72/04* (2013.01); *H04W 92/18* (2013.01); *H04L 61/6022* (2013.01)

(58) Field of Classification Search
CPC ..... H04W 8/005; H04W 72/02; H04W 72/04; H04W 92/18; H04L 61/6022
See application file for complete search history.

(56) References Cited

U.S. PATENT DOCUMENTS

2015/0341794 A1*  11/2015  Vanderveen ....... G06Q 30/0261
                                              705/14.58
2017/0013497 A1*   1/2017  Lee ........................ H04L 67/12
(Continued)

OTHER PUBLICATIONS

International Search Report issued in PCT/JP2016/061436; dated Jun. 28, 2016.

(Continued)

*Primary Examiner* — Rhonda L Murphy
(74) *Attorney, Agent, or Firm* — Studebaker & Brackett PC

(57) ABSTRACT

A user terminal is used in a mobile communication system configured to support Device to Device (D2D) communication that is direct device-to-device communication. The user terminal comprises a controller. The controller is configured to, if determining to execute a D2D discovery procedure targeted to a user terminal out of a cell coverage, execute the D2D discovery procedure by using a D2D data resource in a pre-configured resource pool for D2D communication. The controller is configured to execute, upon executing the D2D discovery procedure, a process of transmitting identification information indicating that data carried by the D2D data resource is used for the D2D discovery procedure.

6 Claims, 13 Drawing Sheets

(56) References Cited

U.S. PATENT DOCUMENTS

2017/0303240 A1* 10/2017 Basu Mallick ....... H04W 72/04
2018/0343632 A1* 11/2018 Lee .......................... H04J 11/00

OTHER PUBLICATIONS

3rd Generation Partnership Project; Technical Specification Group Radio Access Network; Study on LTE Device to Device Proximity Services; Radio Aspects; 3GPP TR36.843 V12.0.1; Mar. 2014; pp. 1-50; Release 12; 3GPP Organizational Partners.
Sony; Discussion on ProSe Discovery through Communication (DtC); 3GPP TSG-RAN WG2 Meeting #85; R2-140357; Feb. 10-14, 2014; pp. 1-5; Prague, Czech Republic.
Intel Corporation; Discussion on ProSe out of coverage discovery; 3GPP TSG RAN WG2 Meeting #85; R2-140730; Feb. 10-14, 2014; pp. 1-4; Prague, Czech Republic.
Alcatel-Lucent et al.; L2 Addresses for Public Safety D2D discovery and communication user data; 3GPP TSG-RAN WG2 Meeting #85; R2-140723; Feb. 10-14, 2014; pp. 1-6; Prague, Czech Republic.
Huawei et al.; UE-to-Network Relay Discovery; 3GPP TSG RAN WG1 Meeting #80b; R1-151865; Apr. 20-24, 2015; pp. 1-5; Belgrade, Serbia.

* cited by examiner

| CONTENTS | BITS |
|---|---|
| UE ID (TARGET ID) | 8 BITS |
| MCS | 5 BITS |
| DISCOVERY IDENTIFICATION INFORMATION | 1 BITS |
| RESERVED | 2 BITS |
| TOTAL | 16 BITS |

FIG. 18

| FIELD NAMES | BITS | CONTENTS |
|---|---|---|
| FREQUENCY HOPPING FLAG | 1 | 0: WITHOUT FREQUENCY HOPPING<br>1: WITH FREQUENCY HOPPING |
| RESOURCE BLOCK ASSIGNMENT AND HOPPING RESOURCE ALLOCATION | 5/7/9/11/12/13 | RESOURCE ALLOCATION INFORMATION IN FREQUENCY DIRECTION |
| TIME RESOURCE PATTEM | 7 | SUBFRAME ALLOCATION PATTERN INFORMATION IN TIME DIRECTION |
| MODULATION AND CODING SCHEME | 5 | MCS (IN RRC RECONFIGURATION) |
| TIMING ADVANCE INDICATION | 6 | CORRECTION VALUE FOR TRANSMISSION TIMING |
| GROUP DESTINATION ID | 8 | TRANSMISSION TARGET ID (TARGET ID) |

USER TERMINAL AND CONTROL METHOD

TECHNICAL FIELD

The present application relates to a user terminal and a control method used in a mobile communication system configured to support Device-to-Device (D2D) communication that is direct device-to-device communication.

BACKGROUND ART

In 3GPP (3rd Generation Partnership Project) which is a project aiming to standardize a mobile communication system, the introduction of a Device to Device (D2D) proximity service is discussed as a new function in Release 12 and onward (see Non Patent Document 1).

The D2D proximity service (D2D ProSe) is a service enabling direct device-to-device communication within a synchronization cluster including a plurality of synchronized user terminals. The D2D proximity service includes a D2D discovery procedure (ProSeDiscovery) in which a proximal terminal is discovered; and D2D communication (ProSeCommunication) that is direct device-to-device communication.

PRIOR ART DOCUMENT

Non-Patent Document

Non Patent Document 1; 3GPP technical report "TR 36.843 V12.0.1" Mar. 27, 2014

SUMMARY

A user terminal according to one embodiment is used in a mobile communication system configured to support Device to Device (D2D) communication that is direct device-to-device communication. The user terminal comprises a controller. The controller is configured to, if determining to execute a D2D discovery procedure targeted to a user terminal out of a cell coverage, execute the D2D discovery procedure by using a D2D data resource in a pre-configured resource pool for D2D communication. The controller is configured to execute, upon executing the D2D discovery procedure, a process of transmitting identification information indicating that data carried by the D2D data resource is used for the D2D discovery procedure.

BRIEF DESCRIPTION OF THE DRAWINGS

FIG. 18 illustrates a content of a second SC according to the second embodiment.

DESCRIPTION OF THE EMBODIMENT

Figure 1:
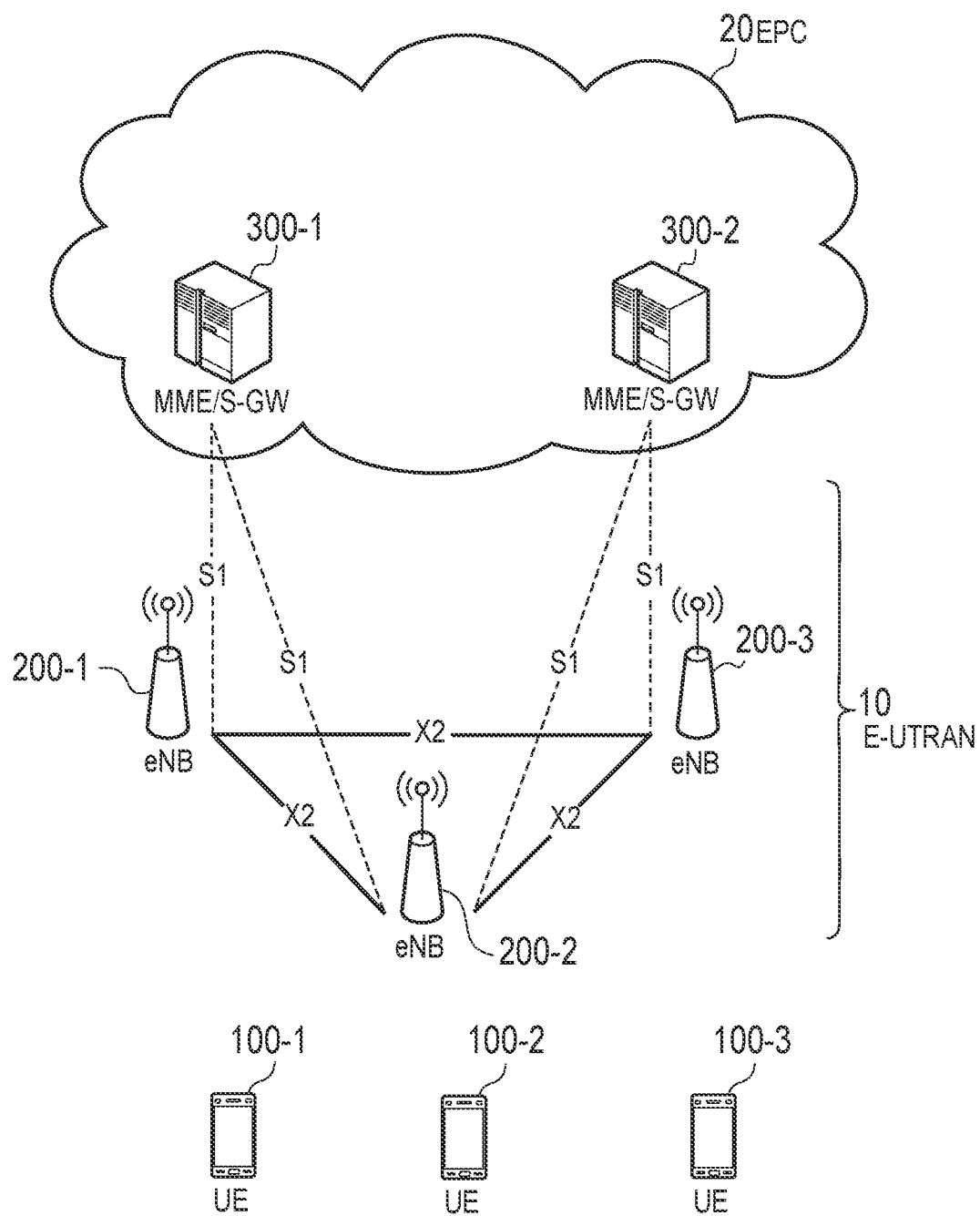
FIG. 1 is a configuration diagram of an LTE system according to a first embodiment.

In the D2D ProSe, a scenario is assumed in which a plurality of synchronized user terminals are located outside of a cell coverage (Out-of-coverage). In such scenario, the plurality of user terminals located out of the cell coverage directly perform device-to-device communication, not through a network. Thus, for an optimal operation in this scenario, it is desirable to efficiently perform a D2D discovery procedure among the plurality of user terminals.

Therefore, the present embodiment provides a user terminal and a control method by which it is possible to realize an efficient D2D discovery procedure when the synchronized plurality of user terminals are located out of the cell coverage.

Overview of Embodiments

A user terminal according to a first embodiment is used in a mobile communication system configured to support Device to Device (D2D) communication that is direct device-to-device communication. The user terminal comprises a controller. The controller is configured to, if determining to execute a D2D discovery procedure targeted to a user terminal out of a cell coverage, execute the D2D discovery procedure by using a D2D data resource in a pre-configured resource pool for D2D communication. The controller is configured to execute, upon executing the D2D discovery procedure, a process of transmitting identification information indicating that data carried by the D2D data resource is used for the D2D discovery procedure.

In the first embodiment, the data is data in a Medium Access Control (MAC) layer, and the identification information is constituted in a first field in a MAC subheader.

In the first embodiment, the MAC subheader constitutes, in a second field, first extended information indicating whether or not the data is last data used for the D2D discovery procedure.

In the first embodiment, the MAC subheader can constitute, for a D2D data transmission to a specific user terminal, a third field indicating identification information of the user terminal, and a fourth field indicating identification information of the specific user terminal. The MAC subheader can further constitute, in a fifth field, second extended information indicating whether or not there is the third field and the fourth field.

In the first embodiment, the MAC subheader sets an octet number of the fourth field to be larger than an octet number of a sixth field constituted when the D2D discovery procedure using the D2D data resource is not executed. The sixth field constitutes identification information of a user terminal to which data is transmitted.

In a second embodiment, the data is data carried in a layer lower than the MAC layer, and the identification information is information carried in a time-frequency resource region for control information in the resource pool for D2D communication.

In a second embodiment, the identification information is explicit information.

In a second embodiment, the identification information is information implicitly indicated by a specific modulation and coding scheme (MCS).

A control method is a control method in a user terminal used in a mobile communication system configured to support Device-to-Device (D2D) communication that is direct device-to-device communication. The control method comprises the steps of: when executing a D2D discovery procedure for a user terminal out of a cell coverage, executing the D2D discovery procedure by using a D2D data resource in a pre-configured resource pool for D2D communication; and transmitting identification information indicating that data carried by the D2D data resource is used for the D2D discovery procedure, upon executing the D2D discovery procedure.

First Embodiment

An embodiment in which the present disclosure is applied to an LTE system will be described, below.

(System Configuration)

FIG. 1 is a configuration diagram of the LTE system according to the first embodiment. As illustrated in FIG. 1, the LTE system according to the first embodiment comprises a UE (User Equipment) 100, an E-UTRAN (Evolved-UMTS Terrestrial Radio Access Network) 10, and an EPC (Evolved Packet Core) 20.

The UE 100 corresponds to a user terminal. The UE 100 is a mobile communication apparatus, which performs radio communication with a cell (serving cell) with which connection is established. The configuration of the UE 100 will be described later.

The E-UTRAN 10 corresponds to a radio access network. The E-UTRAN 10 comprises an eNB 200 (evolved Node-B). The eNB 200 corresponds to a base station. The eNB 200 is connected mutually via an X2 interface. The configuration of the eNB 200 will be described later.

The eNB 200 manages one or a plurality of cells, and performs radio communication with the UE 100 which establishes a connection with a cell of the eNB 200. The eNB 200 has a radio resource management (RRM) function, a routing function of user data, a measurement control function for mobility control and scheduling, and the like. The "cell" is used as a term indicating a smallest unit of a radio communication area, and is also used as a term indicating a function of performing radio communication with the UE 100.

The EPC 20 corresponds to a core network. A network of the LTE system (LTE network) is configured by the E-UTRAN 10 and the EPC 20. The EPC 20 comprises an MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface.

Figure 2:
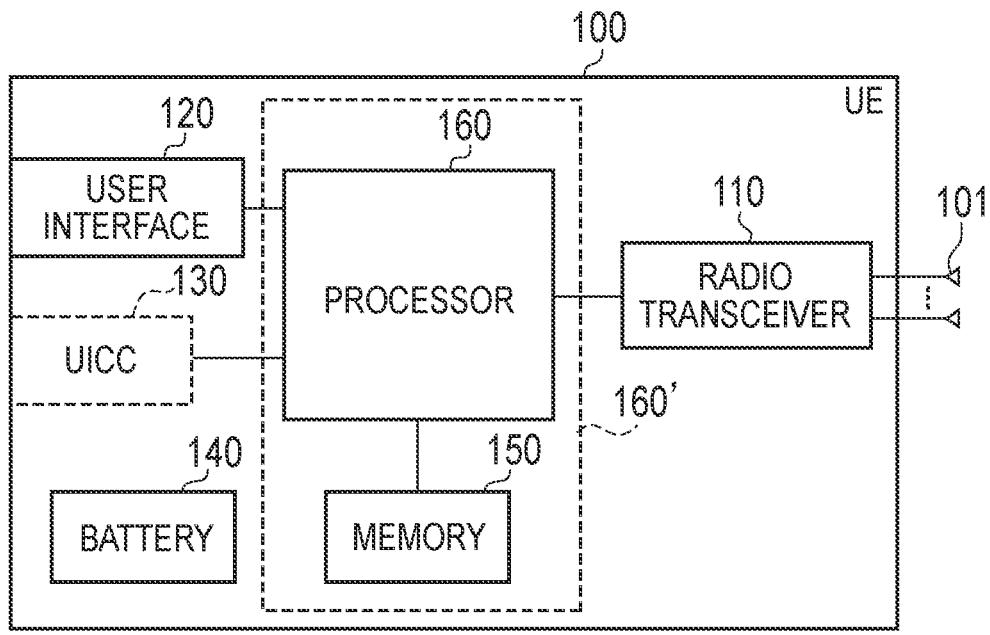
FIG. 2 is a block diagram of a UE (user terminal) according to the first embodiment.

FIG. 2 is a block diagram of the UE 100. As illustrated in FIG. 2, the UE 100 comprises an antenna 101, a radio transceiver 110, a user interface 120, a UICC (Universal Integrated Circuit Card) 130, a battery 140, a memory 150, and a processor 160. The memory 150 corresponds to a storage unit and the processor 160 corresponds to a controller. Furthermore, the memory 150 may be integrally formed with the processor 160, and this set (in other words, a chip set) may be used as a processor 160' (controller) forming a controller. The controller executes various processes and various communication protocols described later.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (reception signal), and outputs the baseband signal to the processor 160. The radio transceiver 110 and the processor 160 configure a transmitter and a receiver.

The radio transceiver 110 may comprise a plurality of transmitter units and/or a plurality of receiver units. In the embodiment, a case is mainly assumed where the radio transceiver 110 comprises one transmitter unit and one receiver unit only.

The user interface 120 is an interface with a user carrying the UE 100, and comprises, for example, a display, a microphone, a speaker, and various buttons. The user interface 120 receives an operation from a user and outputs a signal indicating the content of the operation to the processor 160.

The UICC 130 is a removable storage medium that stores therein subscriber information. The UICC 130 may be called SIM (Subscriber Identity Module) or USIM (Universal SIM). The UICC 130 stores the "pre-configured parameter" described later.

The battery 140 accumulates power to be supplied to each block of the UE 100. In case that the UE 100 is a card-type terminal, the UE 100 may not comprise the user interface 120 nor the battery 140.

The memory 150 stores a program to be executed by the processor 160 and information to be used for a process by the processor 160.

The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various types of processes and various types of communication protocols described later.

Figure 3:
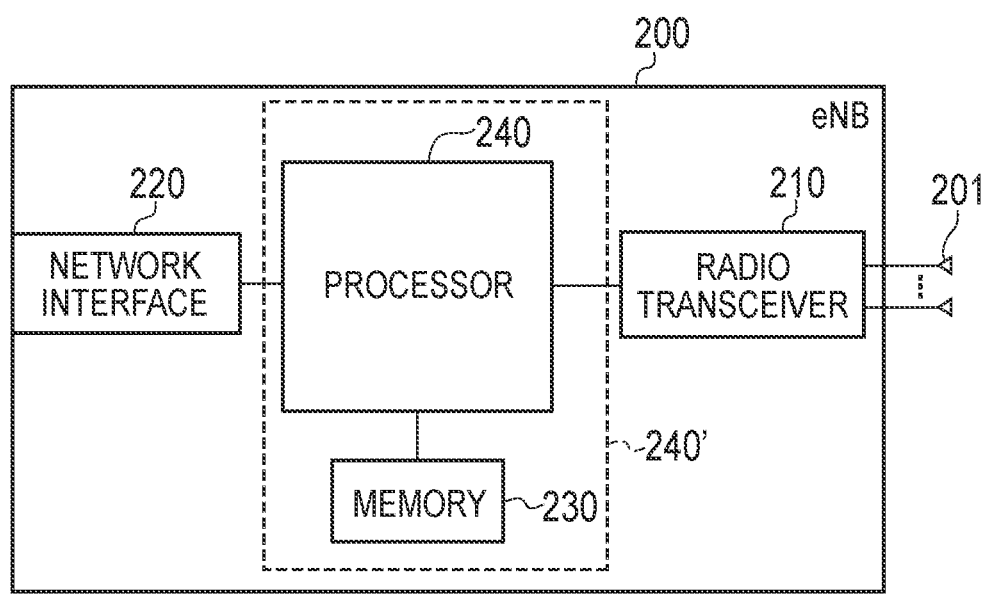
FIG. 3 is a block diagram of an eNB (base station) according to the first embodiment.

FIG. 3 is a block diagram of the eNB 200. As illustrated in FIG. 3, the eNB 200 comprises an antenna 201, a radio transceiver 210, a network interface 220, a memory 230, and a processor 240 (controller). It is noted that the memory 230 is integrated with the processor 240, and this set (in other words, a chipset) may be used as a processor 240' (controller) forming a controller.

The antenna 201 and the radio transceiver 210 are used to transmit and receive the radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (reception signal), and outputs the baseband signal to the processor 240. The radio transceiver 210 and the processor 240 configure a transmitter and a receiver.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
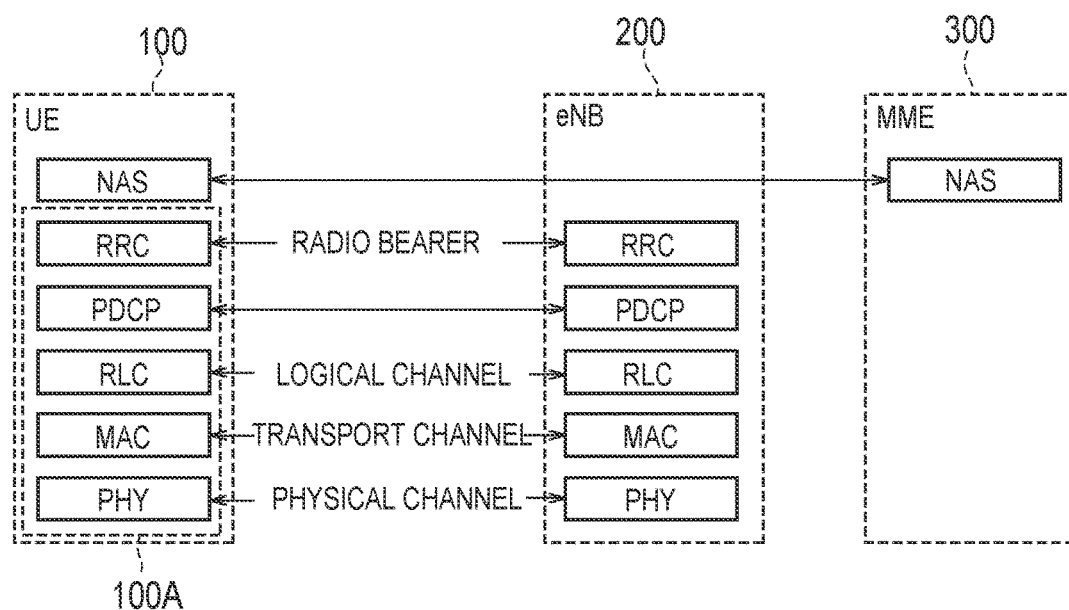
FIG. 4 is a protocol stack diagram of a radio interface in the LTE system.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding and decoding, modulation and demodulation, antenna mapping and demapping, and resource mapping and demapping. Between the physical layer of the UE 100 and the physical layer of the eNB 200, user data and control signals are sent via a physical channel.

The MAC layer performs priority control of data, and a retransmission process and the like by a hybrid ARQ (HARQ). Between the MAC layer of the UE 100 and the MAC layer of the eNB 200, user data and control signals are sent via a transport channel. The MAC layer of the eNB 200 includes a scheduler for determining (scheduling) a transport format (a transport block size and a modulation and coding scheme) of an uplink and a downlink, and a resource block to be allocated to the UE 100.

The RLC layer sends data to an RLC layer of a reception side by using the functions of the MAC layer and the physical layer. Between the RLC layer of the UE 100 and the RLC layer of the eNB 200, user data and control signals are sent via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (RRC message) for various types of configurations is sent. The RRC layer controls a logical channel, a transport channel, and a physical channel depending on the establishment, re-establishment, and release of a radio bearer. In case that there is a connection (an RRC connection) between the RRC of the UE 100 and the RRC of the eNB 200, the UE 100 is in an RRC connected mode. Otherwise, the UE 100 is in an RRC idle mode.

An NAS (Non-Access Stratum) layer positioned above the RRC layer performs session management, mobility management, and the like.

In the UE 100, the physical layer to the RRC layer configure an AS (Access Stratum) entity 100A. The NAS layer configures an NAS entity 100B. Functions of the AS entity 100A and the NAS entity 100B are executed by the processor 160 (controller). In other words, the processor 160 (controller) includes the AS entity 100A and the NAS entity 100B. In the idle mode, the AS entity 100A performs the cell selection/reselection, and the NAS entity 100B performs the PLMN selection.

Figure 5:
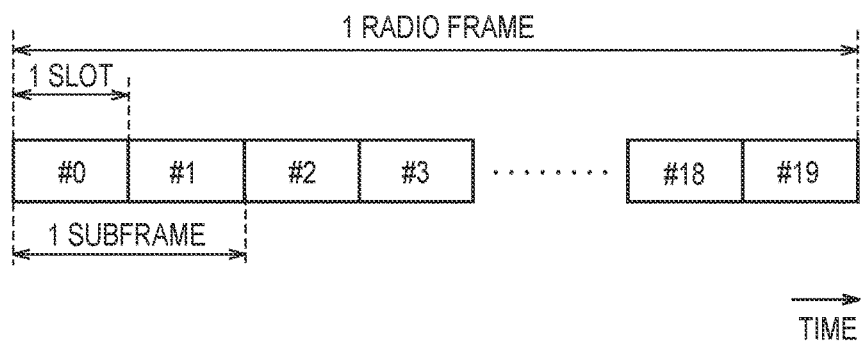
FIG. 5 is a configuration diagram of a radio frame used in the LTE system.

FIG. 5 is a configuration diagram of a radio frame used in the LTE system. In the LTE system, OFDMA (Orthogonal Frequency Division Multiple Access) is applied to a downlink (DL), and SC-FDMA (Single Carrier Frequency Division Multiple Access) is applied to an uplink (UL), respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each of the resource blocks includes a plurality of subcarriers in the frequency direction. A resource element is configured by one subcarrier and one symbol. Of the radio resources allocated to the UE 100, a frequency resource is configured by a resource block, and a time resource is configured by a subframe (or a slot).

(Overview of D2D Discovery Procedure)

As to the D2D proximity service according to the first embodiment, the D2D discovery procedure will be mainly described, below. The LTE system according to the first embodiment supports the D2D proximity service.

The D2D proximity service (D2D ProSe) is a service enabling direct UE-to-UE communication within a synchronization cluster including a plurality of synchronized UEs 100. The D2D proximity service includes: a D2D discovery procedure (ProSe Discovery) in which a proximal UE is discovered; and D2D communication (ProSe Communication) that is direct UE-to-UE communication. The D2D communication may be referred to as Direct communication.

A scenario in which all the UEs 100 forming the synchronization cluster are located in a cell coverage is called "In coverage". A scenario in which all the UEs 100 forming the synchronization cluster are located out of a cell coverage is called "Out of coverage". A scenario in which some UEs 100 in the synchronization cluster are located in a cell coverage and the remaining UEs 100 are located out of the cell coverage is called "Partial coverage".

It is assumed that the D2D discovery procedure is performed in In coverage, Out of coverage and Partial coverage.

Figure 6:
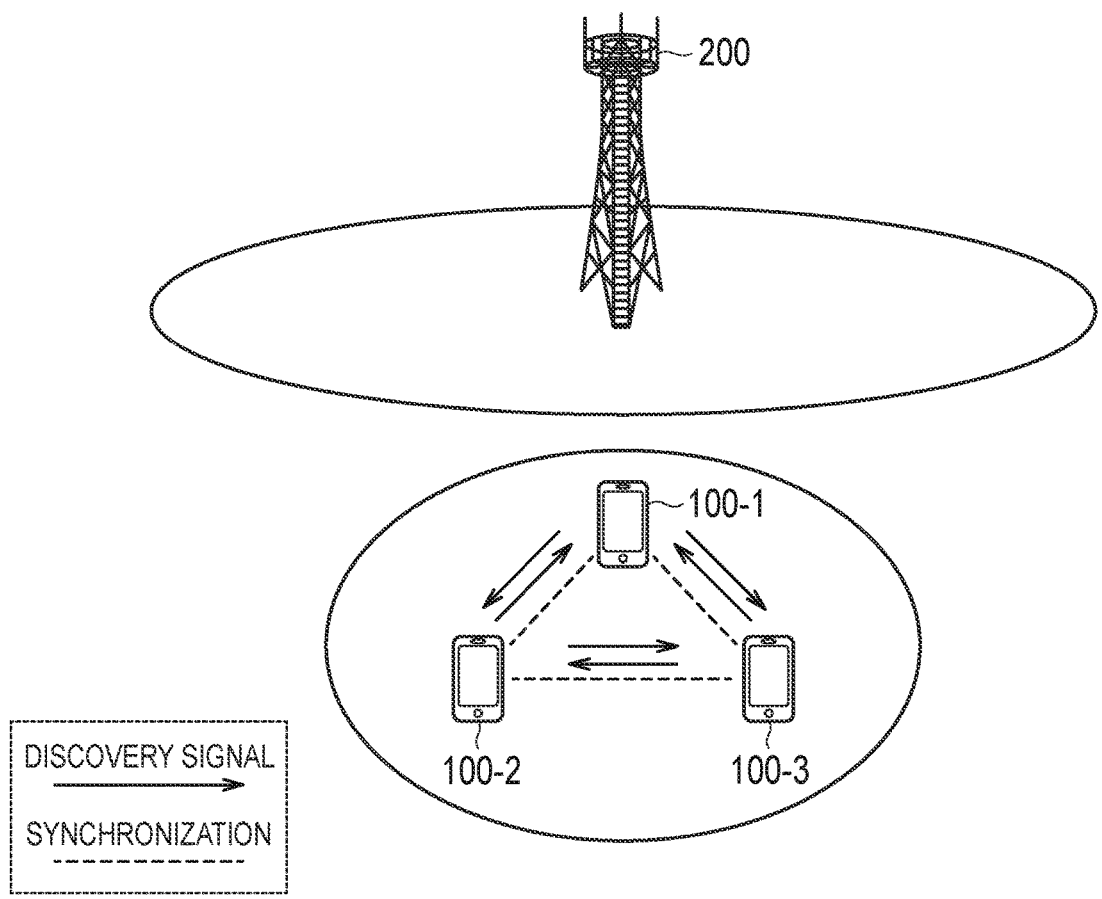
FIG. 6 is a diagram illustrating an operation environment according to the first embodiment.

In the first embodiment, an "Out of coverage" scenario illustrated in FIG. 6 will be described. FIG. 6 is a diagram illustrating an operation environment according to the first embodiment.

In FIG. 6, a situation is illustrated in which a UE 100-1, a UE 100-2, and a UE 100-3, out of a coverage of the eNB 200, utilize the D2D proximity service. It is noted that three UEs 100 are illustrated in FIG. 6, however, at least two UEs 100 are necessary.

In FIG. 6, it is assumed that the UE 100-1 is a synchronization source, and the UE 100-2 and the UE 100-3 are asynchronous sources. The UE 100-1, the UE 100-2, and the UE 100-3 are assumed to synchronize with each other with the UE 100-1 being the synchronization source. While synchronizing with each other, the UE 100-1, the UE 100-2, and the UE 100-3 execute a D2D discovery procedure.

In the D2D discovery procedure, each UE 100 (the UE 100-1, the UE 100-2, and the UE 100-3) transmits a D2D discovery signal (Discovery signal) for discovering a proximal terminal.

Schemes of the D2D discovery procedure include: a first scheme (Type 1 discovery) in which a radio resource not uniquely allocated to the UE 100 is used for transmitting the D2D discovery signal; and a second scheme (Type 2 discovery) in which a radio resource uniquely allocated to each UE 100 is used for transmitting the D2D discovery signal.

In the first scheme, a D2D discovery signal resource pool is used for transmitting the D2D discovery signal. The D2D discovery signal resource pool is shared in the synchronization cluster including the plurality of synchronized UEs 100.

Furthermore, two operation modes (Mode 1 and Mode 2) are defined for D2D communication. In the Mode 1, the eNB 200 or a relay node not illustrated allocates a radio resource for transmitting D2D data (D2D data and/or control data). In the Mode 2, the UE 100 itself selects, from the resource pool, a radio resource for transmitting D2D data (D2D data and/or control data).

In the first embodiment, an example is assumed in which the operation of the Mode 2 of D2D communication is utilized to execute the D2D discovery procedure. That is, in the first embodiment, a scenario is assumed in which the UE 100-1 transmits a D2D discovery signal in a resource pool for D2D communication, as well as performs D2D communication in the Mode-2 in "out of coverage". This scenario may be referred to as "Discovery through Communication (DtC) for out of coverage". Hereinafter, for the purpose of description, this scenario is referred to as "DTC scenario out of coverage" where appropriate.

In the DTC scenario out of coverage, a constitution of the resource pool for D2D communication and the like described above is pre-configured. Hereinafter, a parameter configured beforehand is referred to as "Pre-configured parameter". It is noted that, in an information element included in the Pre-configured parameter, identical pre-configured parameters are configured for UEs used for identical purposes (military, fire-fighting, police, and the like).

It is noted that the resource pool for D2D communication includes a resource pool for control information and a resource pool for data. Information indicating the constitution of each resource pool includes: a parameter specifying a time-frequency domain in which a resource pool for D2D communication is initially constituted in a radio frame (an offset value for designating a start position); a parameter designating a resource in a frequency direction in the resource pool for D2D communication (frequency direction resource-designating parameter); a repeat period of the resource pool for D2D communication; and information (bit map information) indicating whether a certain subframe is a time-frequency resource that can be used for D2D communication.

The Pre-configured parameter is provided to the UE 100. Here, it is assumed that the Pre-configured parameter is stored in advance in the UICC 130 of the UE 100. It is noted that if the Pre-configured parameter is not stored in advance in the UICC 130, the UE 100 may store the Pre-constituted parameter in the memory 150 by being provided from a network (such as OAM) via the eNB at a predetermined occasion.

(D2D Discovery Procedure in DTC Scenario Out of Coverage)

As described above, the plurality of UEs 100 out of the coverage, included in the synchronized cluster can perform the D2D communication in the Mode 2. In this case, each UE 100 can use the time-frequency resource in the resource pool for D2D communication to transmit communication data. Here, if a UE 100 at the transmission side executes the D2D discovery procedure, the UE 100 must use the time-frequency resource in the resource pool for D2D communication to transmit the D2D discovery signal. In this case, it is assumed that a UE 100 at the reception side cannot distinguish whether the received signal is a D2D discovery signal or a signal for communication data.

Accordingly, a technology is required to avoid the above-described situation, that is, to efficiently perform the D2D discovery procedure among a plurality of user terminals in DTC scenario out of coverage. Hereinafter, such technology will be described.

Description of Operation According to First Embodiment

Figure 7:
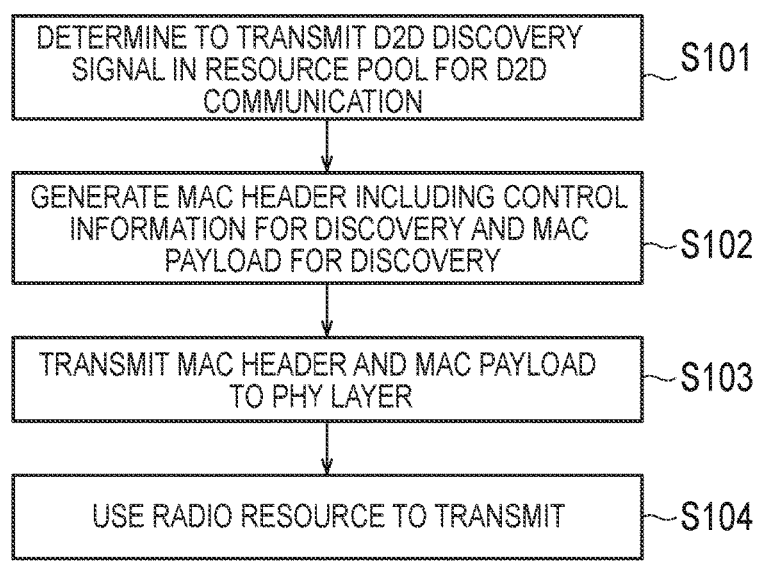
FIG. 7 is a diagram illustrating an operation state according to the first embodiment.
Figure 8:
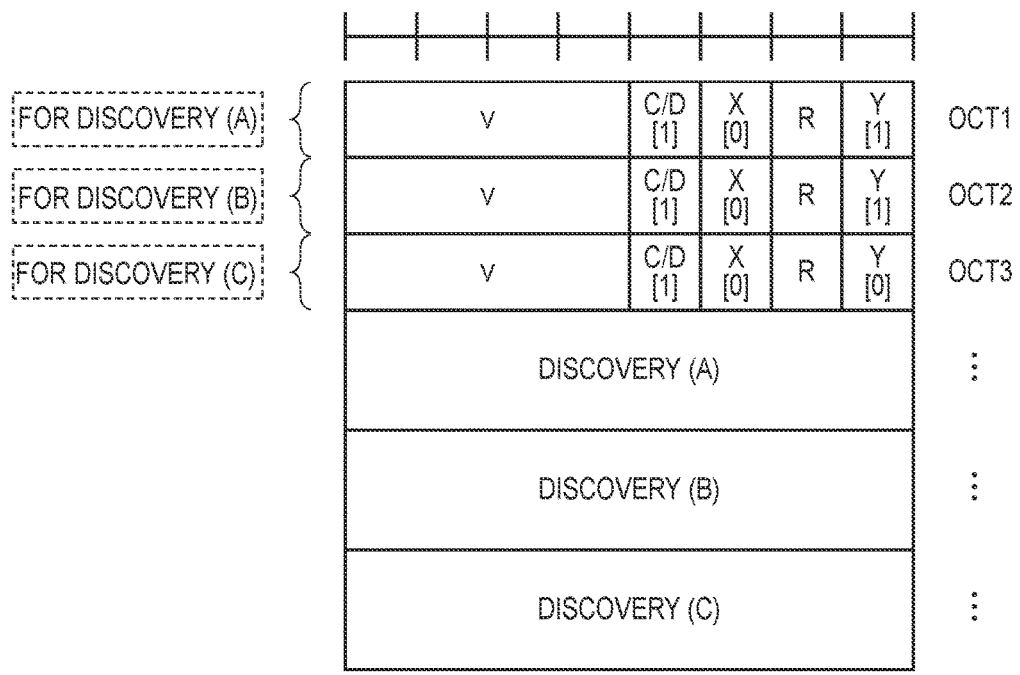
FIG. 8 is a diagram illustrating a usage example of a MAC header according to the first embodiment.
Figure 9:
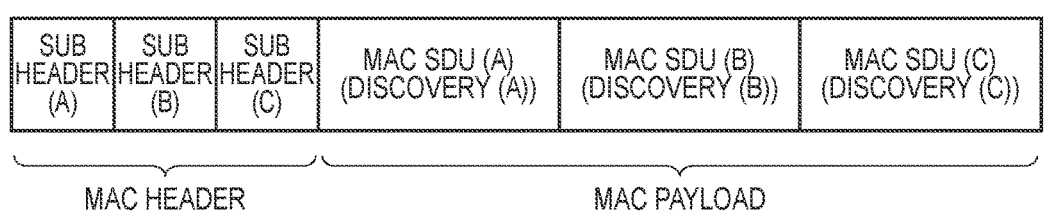
FIG. 9 is a diagram illustrating a configuration of the MAC header and a MAC payload.
Figure 10:
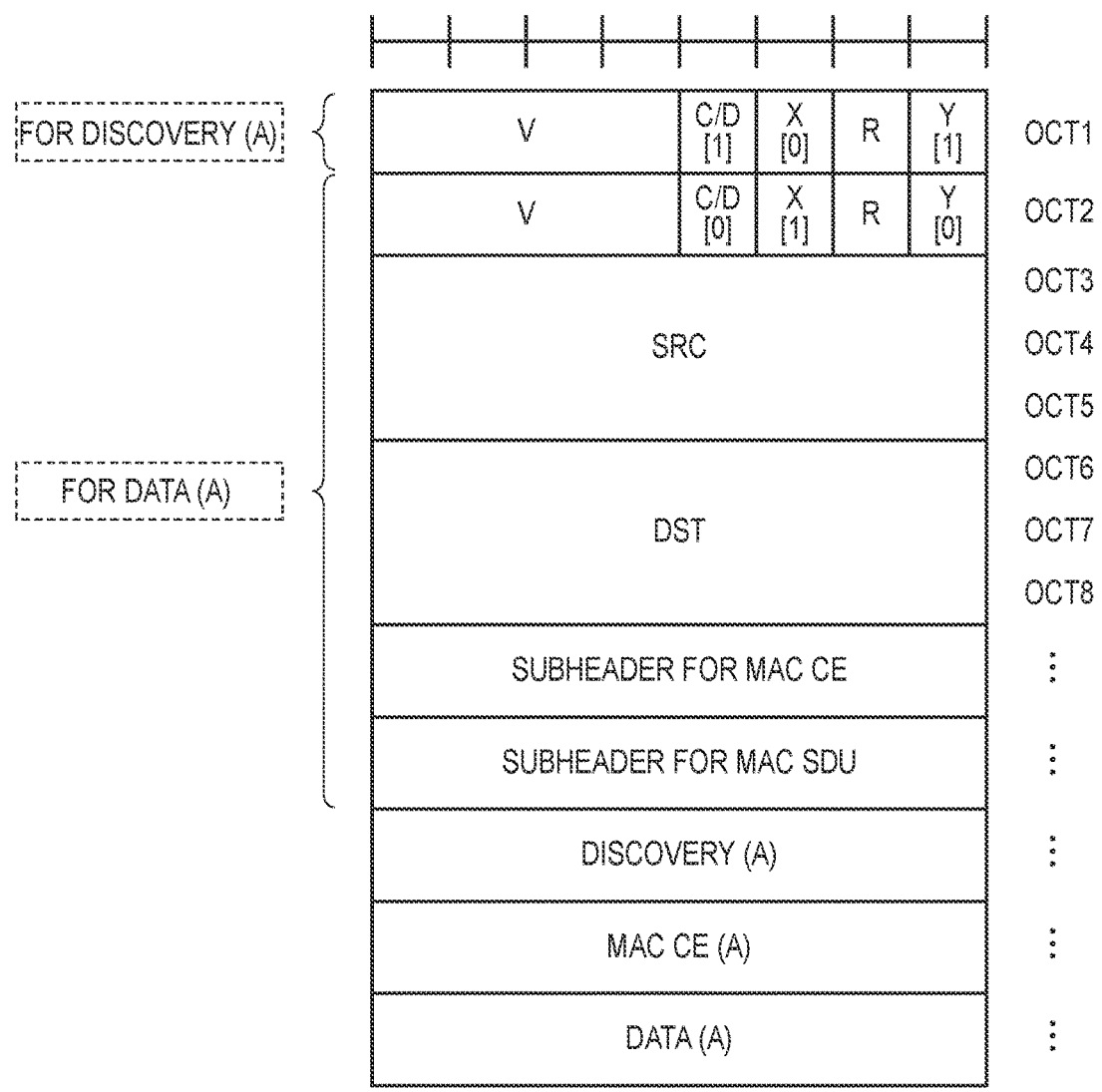
FIG. 10 is a diagram illustrating another usage example (1) of the MAC header.
Figure 11:
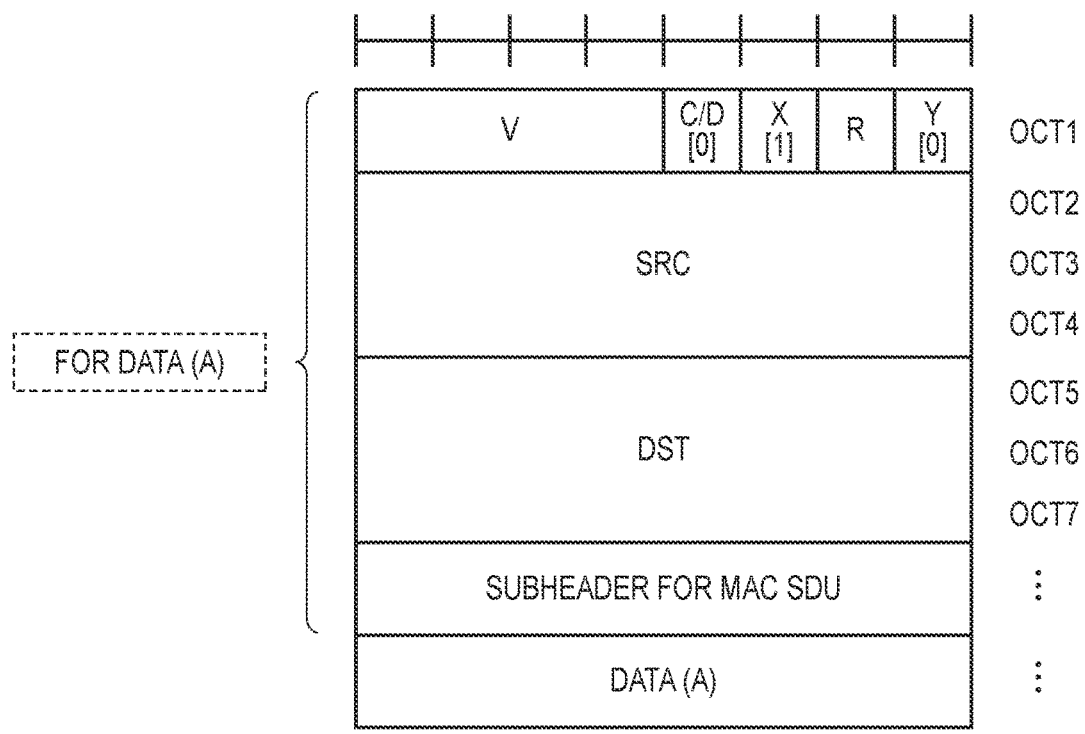
FIG. 11 is a diagram illustrating another usage example (2) of the MAC header.
Figure 12:
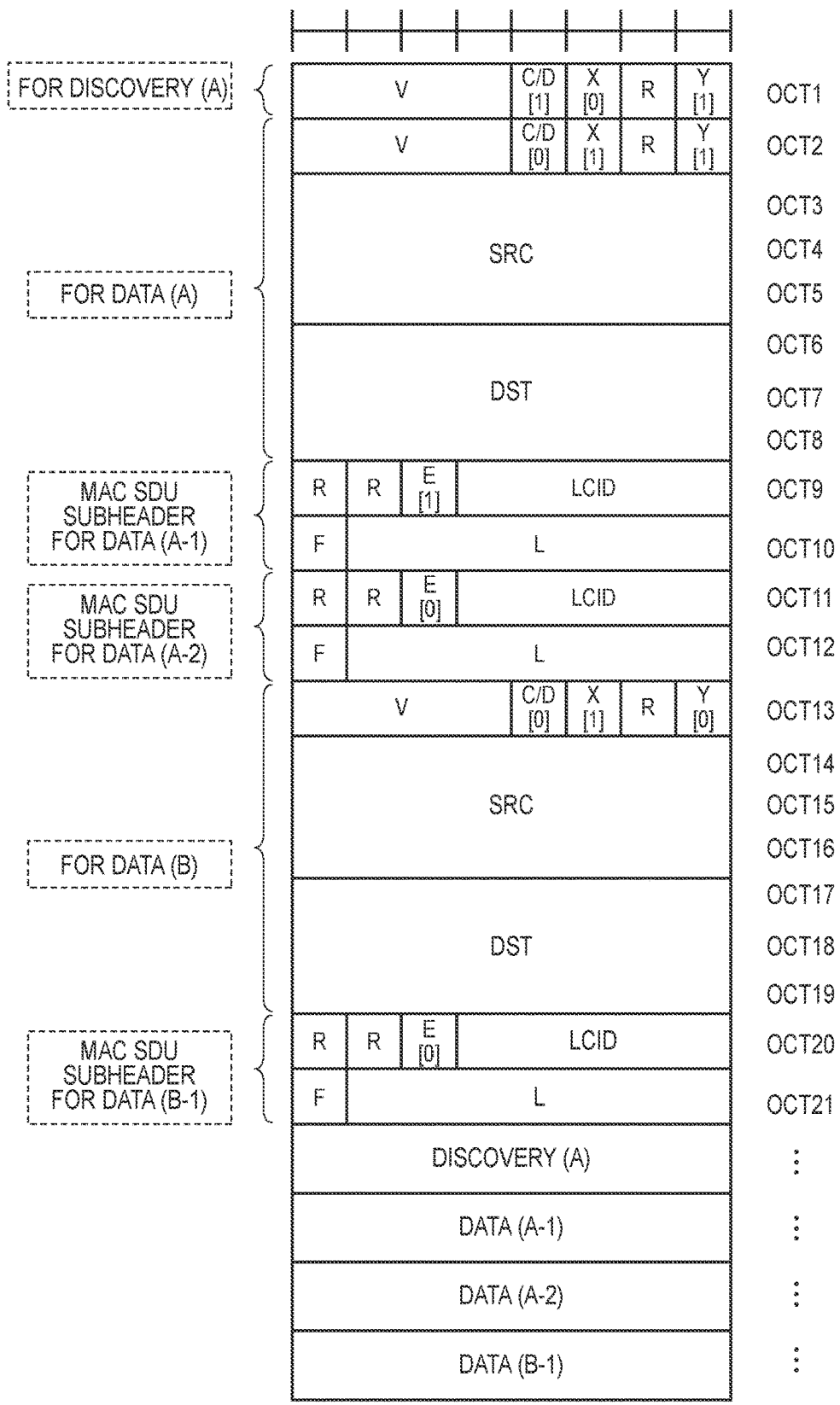
FIG. 12 is a diagram illustrating another usage example (3) of the MAC header.
Figure 13:
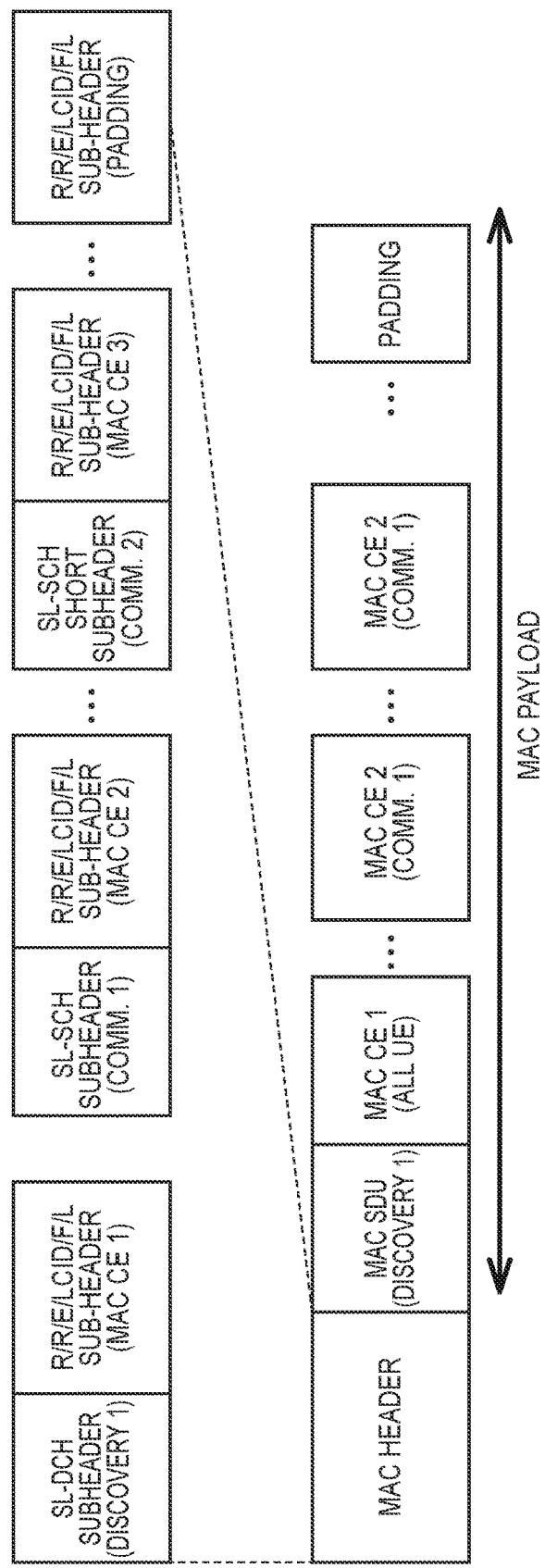
FIG. 13 is a diagram illustrating another configuration of the MAC header and the MAC payload.
Figure 14:
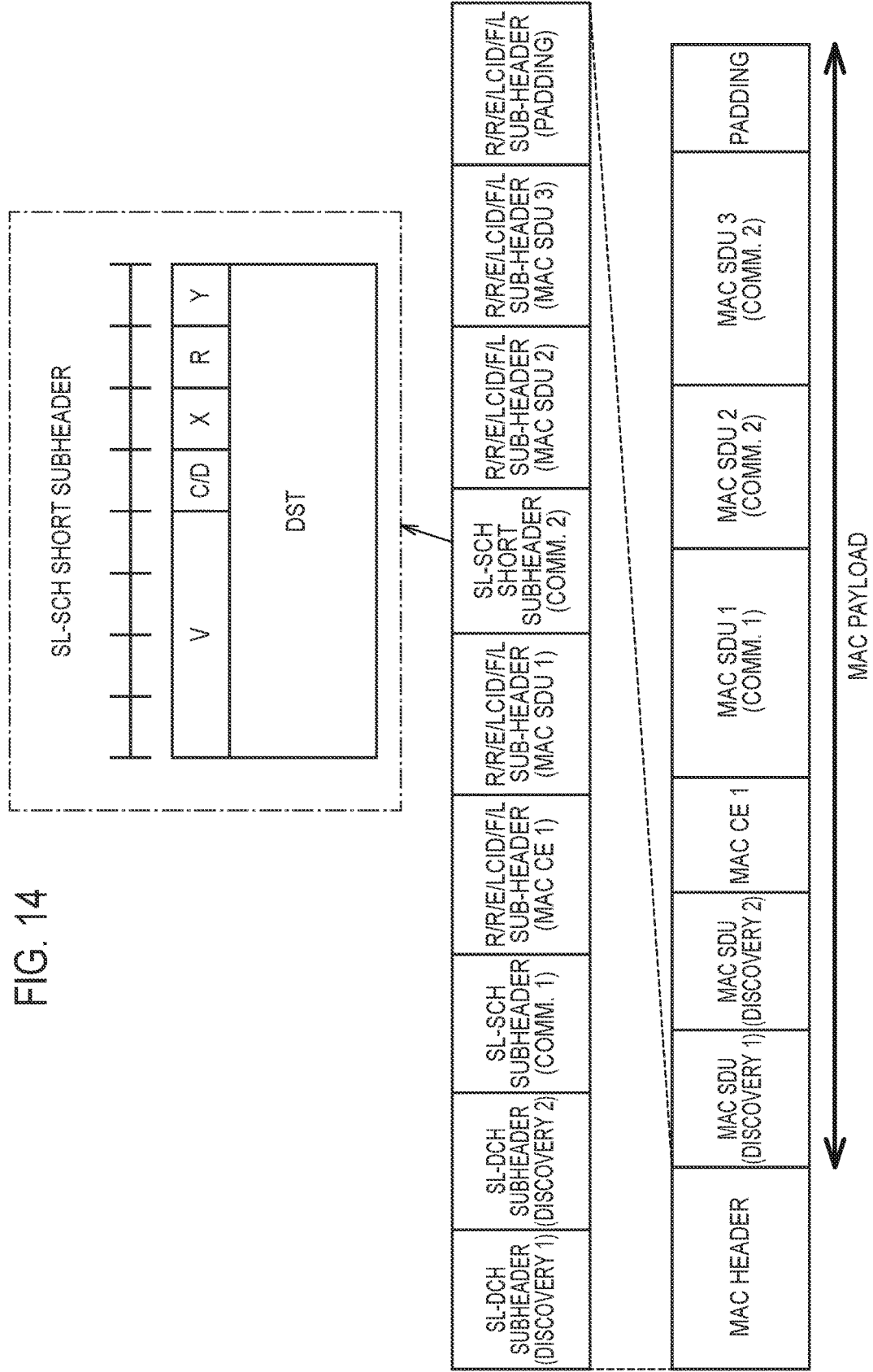
FIG. 14 is a diagram illustrating yet another configuration of the MAC header and the MAC payload.

Hereinafter, operation contents of the first embodiment will be described, with reference to FIG. 7 to FIG. 14. FIG. 7 illustrates an operation state according to the first embodiment. FIG. 8 illustrates a usage example of a MAC header according to the first embodiment. FIG. 9 illustrates a configuration of the MAC header and a MAC payload. FIG. 10 illustrates another usage example (1) of the MAC header. FIG. 11 illustrates another usage example (2) of the MAC header. FIG. 12 illustrates another usage example (3) of the MAC header. FIG. 13 illustrates another configuration of the MAC header and the MAC payload. FIG. 14 illustrates yet another configuration of the MAC header and the MAC payload. It is noted that a process executed by the UE 100 is executed by the controller 160 (160') of the UE 100, however, for convenience, description of FIG. 7 to FIG. 14 is given on the assumption that the UE 100 performs the process.

As a premise, among a plurality of UEs 100 (UEs 100-1 to N {N>2}), the UE 100-1 is a synchronization source and the other UEs 100 (UEs 100-2 to N) are asynchronous sources. The plurality of UEs 100 (UEs 100-1 to N) synchronize with each other with the UE 100-1 being the synchronization source.

Here, each UE 100 of the plurality of UEs 100 stores a Pre-configured parameter including information indicating the constitution of a resource pool for D2D communication in the UICC 130 in advance.

In FIG. 7, if D2D communication can be performed in the Mode 2 out of the coverage, the UE 100 determines to transmit a D2D discovery signal (discovery signal) in the resource pool for D2D communication (step S101).

Next, a MAC entity of the UE 100 not illustrated generates information in a MAC layer. The MAC entity generates a MAC header including control information for Discovery (for a D2D discovery procedure) and a MAC payload for Discovery (step S102).

FIG. 8 and FIG. 9 illustrate an example of the MAC header and the MAC payload in a MAC PDU (protocol data unit) generated by the MAC entity in step S102. In FIG. 8, a "v" field of octet 1 indicates a version of the communication system. It is noted that the "v" field may indicate information other than the version of the communication system.

A "C/D" field subsequent to the "v" field is identification information including one bit ("0" or "1") indicating whether data carried by a D2D data resource (MAC payload in the first embodiment) is used for Communication or for Discovery. The "C/D" fields in FIG. 8 indicate "1". "1" in this case indicates that a MAC payload stored in a subsequent field is used for Discovery. It is noted that if the "C/D" field is "0", it indicates that a MAC payload stored in a subsequent field is used for Communication.

An "X" field subsequent to the "C/D" field is extended information including one bit ("0" or "1") indicating whether or not an "SRC" field indicating identification information of the user terminal 100 (ID of the source UE) for transmitting communication data to a certain user terminal 100 (see FIG. 10), and a "DST" field indicating identification information of the certain user terminal 100 (ID of the target UE) (FIG. 10) are stored in a subsequent field. All of the "X" fields in FIG. 8 indicate "0". "0" in this case indicates that the "SRS" field and the "DST" field are not constituted in the subsequent field. It is noted that if the "X" field is "1", the "SRC" field and the "DST" field are constituted in the subsequent field as illustrated in FIG. 10.

An "R" field is a reserve field.

A "Y" field is extended information indicating whether or not a MAC payload stored in a subsequent field is a last payload as a payload used for Discovery or for Communication. The "Y" fields of octet 1 and octet 2 in FIG. 8 indicate "1". "1" in this case indicates that the MAC payload stored in the subsequent field is not the last payload as a payload used for Discovery but is continuously used for another Discovery. The "Y" field of octet 3 in FIG. 8 indicates "0". "0" in this case indicates that the MAC payload stored in the subsequent field is the last payload as a payload used for Discovery.

The example of FIG. 8 illustrates a constitution of the MACPDU for storing MAC payloads for three Discoveries (Discovery {A}, {B}, {C}). The example of FIG. 10 illustrates a constitution for storing, in one MAC PDU, a MAC payload for one Discovery (Discovery {A}) and Data for a certain user terminal 100 (Data {A}).

In FIG. 7, upon generating, in step S102, the MAC header and the MAC payload as illustrated in FIG. 8, the MAC entity of the UE 100 sends the generated information to a PHY layer of the UE 100 (step S103).

The PHY layer of the UE 100 executes a process of using a time-frequency resource (radio resource) for D2D communication in a pre-configured resource pool for D2D communication to transmit the above-described information from the MAC layer (step S104).

The reception side UE 100 that received the data transmitted in step S104 recognizes, in the MAC layer, bit information indicated in the "C/D" field, the "X" field, and the "Y" field illustrated in FIG. 8 (FIG. 10). The reception side UE 100 understands a meaning of information indicated by each of the above-described fields to execute the subsequent process.

It is noted that the example of FIG. 10 is applied if a D2D discovery procedure and D2D communication are simultaneously executed. In the example of FIG. 10, a "subheader for MAC CE" and a "subheader for MAC SDU" utilized also in cellular communication are constituted in the field subsequent to a subheader for data of octets 2 to 8 (SL-SCH subheader).

Furthermore, in the example of FIG. 10, the example is illustrated in which the "SRC" field and the "DST" field are constituted, but an octet number of the "DST" field in this case may be set to be larger than an octet number of the "DST" field constituted in a normal D2D communication scenario (when the D2D discovery procedure using the D2D data resource is not executed). If the octet number of the "DST" field constituted in the normal D2D communication scenario is "2" (equivalent to 16 bits), in the example of FIG. 10, the octet number of the "DST" field is "3" (equivalent to 24 bits). It is noted that the octet number of the "DST" field in this case is satisfactory as long as it is "3" or more. In this context, reasons for extending the "DST" field is as follows.

First, in the normal D2D communication scenario, the UE 100 at the transmission side can use a Sidelink Control (SC) resource pool to send identification information of the target UE 100 (target UE-ID). However, if the D2D discovery procedure is executed in the DTC scenario, the transmission of the identification information of the target UE by using the SC resource pool is omitted. This is because the D2D discovery signal is a broadcast signal and the UE 100 at the transmission side can transmit the D2D discovery signal without specifying the target UE. Thus, if attempting to transmit communication data to a certain UE 100 in the DTC scenario, an opportunity to obtain the identification information of the target UE can be secured for the certain UE 100 by increasing the octet number of the "DST" field. Thus, a UE 100 other than the certain UE, if recognizing that a target UE-ID stored in the "DST" field is not an ID for the UE 100, can discard the subsequent MAC payload. Furthermore, the certain UE 100, if being capable of recognizing that the target UE-ID stored in the "DST" field is the ID for the certain UE 100, can execute the reception operation of the subsequent MAC payload.

(Other Usage Example of MAC Header)

FIG. 11 and FIG. 12 illustrate the other usage examples of the MAC header. The example of FIG. 11 illustrates a content of the field when a UE 100 having an ability to transmit the above-described MAC payload for Discovery transmits communication data for a predetermined period. The content of each field is as described above. It is noted that in the example of FIG. 11, an ID for broadcast is used in sidelink control information (SCI) described later, and thus, the ID of the target UE (destination ID) is stored, without being omitted, in the "DST" field in the MAC header.

In the example of FIG. 12, a method of recognizing each data, when data to a plurality of destinations are stored in the MAC PDU will be described. The MAC entity of the UE 100 understands an indication (Y=1) that there is a MAC subheader for communication data to another destination subsequently in the "Y" field of Oct 2 in the MAC subheader for communication data (Oct 2 to Oct 8). Next, the MAC entity of the UE 100 understands an indication (E=0) that there is no MAC subheader for designating the MAC SDU or the MAC CE subsequently in an "E" field of Oct 11 indicating whether or not there is a MAC subheader for designating the MAC SDU or the MAC CE subsequently in the further subsequent MAC subheader for designating the MAC SDU (Oct 11 to Oct 12). Thus, the MAC entity of the UE 100 recognizes that a MAC subheader for communication data to another destination (Oct 13 to Oct 19) are stored from the next octet.

Furthermore, the MAC entity of the UE 100 understands, in the MAC subheader for communication data (Oct 13 to 19), an indication (Y=0) that there is no MAC subheader for communication data to another destination subsequently in the "Y" field of Oct 13. The MAC entity of the UE 100 understands an indication (E=0) that there is no MAC subheader for designating the MAC SDU or the MAC CE subsequently in the "E" field of the further subsequent MAC subheader for designating the MAC SDU (Octs 20 to 21). Thus, the MAC entity of the UE 100 recognizes that the MAC SDU or the MAC CE is stored from the next octet. In FIG. 12, the MAC entity recognizes that the Discovery (A) corresponding to the MAC subheader for a discovery stored at the beginning of the MAC header is stored.

In the example of FIG. 13, a method of storing, by the transmission source UE 100, in the MAC PDU, MAC control information (MAC control element (MAC CE)) toward a plurality of destination UEs 100 will be described. If the transmission source UE 100 desires to notify the MAC CE without designating a certain UE 100, the UE 100 stores the MAC subheader for MAC CE after the MAC subheader for Discovery. If the transmission source UE 100 desires to notify a certain user of the MAC CE, the UE 100 stores the MAC CE after the MAC subheader for communication data of the certain destination UE 100. If simultaneously receiving two MAC CEs, the UE 100 at the reception side (that is a transmission target) may utilize one MAC CE by determination of the UE 100 at the reception side, or preferentially utilize the MAC CE notified to the certain destination UE 100.

The example of FIG. 14 illustrates a more efficient method of transmitting a MAC PDU when the transmission source UE 100 transmits data for Communication toward the plurality of the destination UEs 100. The MAC subheader designating the data for Communication includes an SRC that is an identifier indicating the transmission source UE 100. Thus, if the transmission source UE 100 multiplexes the communication data for the plurality of destination UEs 100 in the MAC PDU, the transmission source UE 100 may notify the SRC in the MAC subheader designating communication data of a destination UE 100 and omit the SRC in another MAC subheader designating communication data to another destination to reduce the octet number utilized by the MAC subheader.

Modification of First Embodiment

In the above-described first embodiment, the "C/D" field is constituted in the MAC header and the identification information indicating that a MAC payload stored in a subsequent field is a payload used for Discovery is stored in the "C/D" field, but it may be indirectly indicated, by version information indicated by the "v" field without constituting such "C/D" field, that a MAC payload stored in a subsequent field is a payload used for Discovery. That is, a definition may be provided in advance that if the version information indicated by the "v" field indicates a latest version, a MAC payload stored in a subsequent field is a payload used for Discovery.

Summary of First Embodiment

In the first embodiment, as described above, the UE 100 stores, in a MAC header, identification information indicating that a MAC payload stored in a subsequent field is a payload used for Discovery. Additionally, the UE 100 can generate data in which a MAC payload in a field subsequent to the identification information is set for Discovery, and the generated data can be transmitted by using a D2D data resource in a pre-configured resource pool for D2D communication. The UE 100 at the reception side can understand, by the identification information, that the received MAC payload is used for Discovery. Thus, the D2D discovery procedure is efficiently performed among plurality of user terminals in DTC scenario out of coverage.

Second Embodiment

Figure 15:
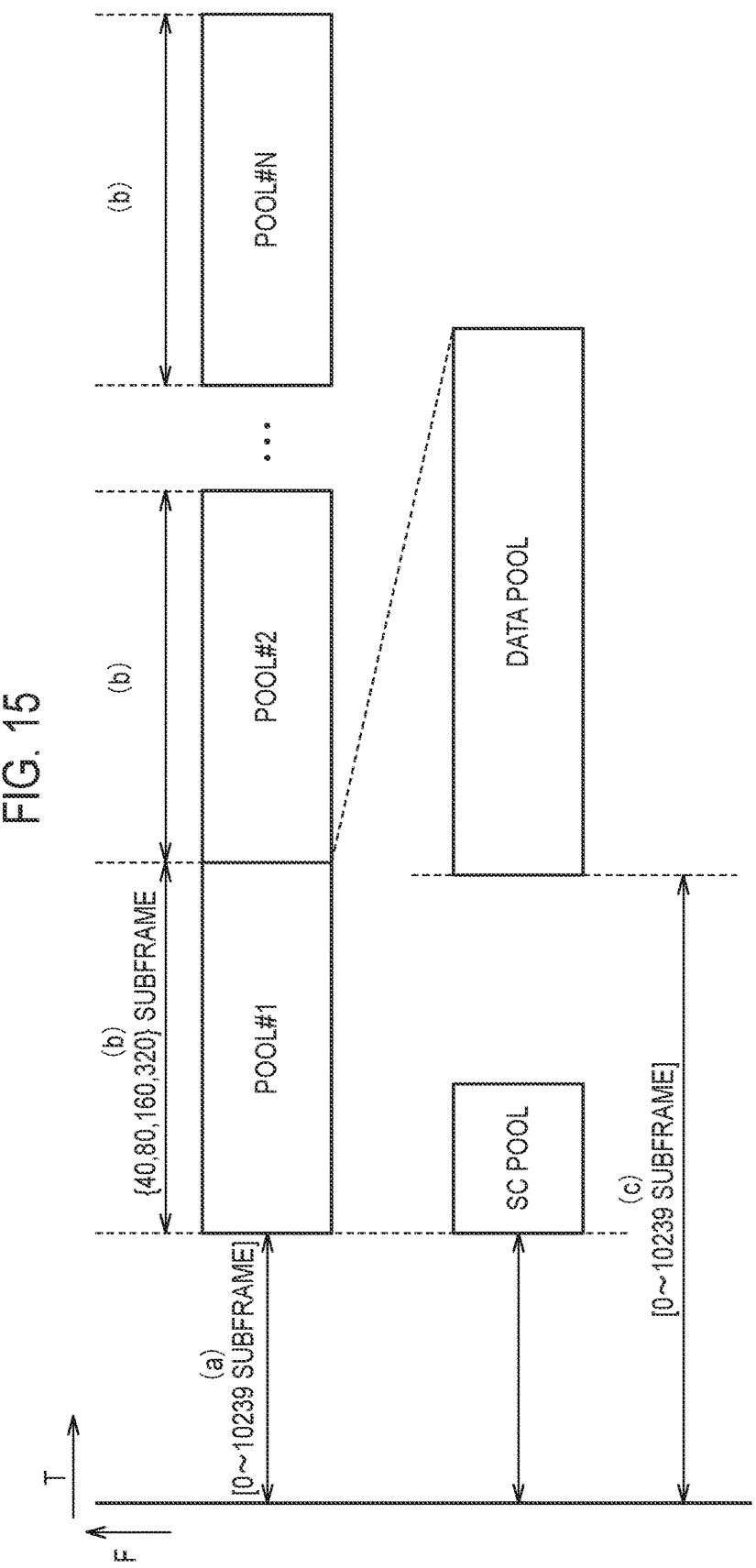
FIG. 15 is a diagram for describing a communication resource pool according to a second embodiment.
Figures 16, 17:
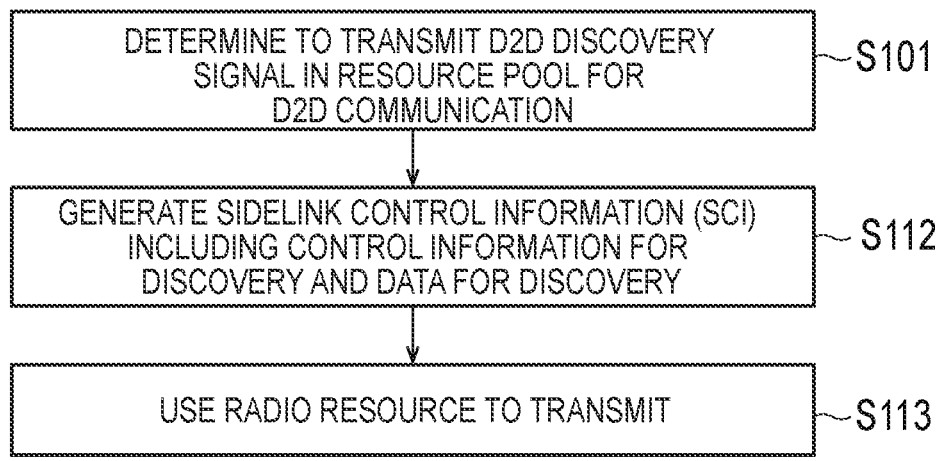
FIG. 16 is a diagram illustrating an operation state according to the second embodiment.
FIG. 17 is a diagram illustrating a content of a first SC according to the second embodiment.

Next, a second embodiment will be described with reference to FIG. 15 to FIG. 18. Description of parts similar to those in the first embodiment will be omitted where appropriate. FIG. 15 is a diagram for describing a communication resource pool according to the second embodiment. FIG. 16 is a diagram illustrating an operation state according to the second embodiment. FIG. 17 is a diagram illustrating a content of a first SC according to the second embodiment. FIG. 18 illustrates a content of a second SC according to the second embodiment.

In the first embodiment, an example was described in which the UE 100 stores, in a MAC header, identification information indicating that a MAC payload stored in a subsequent field is a payload used for Discovery. In contrast, the second embodiment indicates an example for constituting identification information indicating that data carried in a data pool (D2D data resource) is used for a D2D discovery procedure in a pre-configured Sidelink Control (SC) resource pool of a communication resource pool. It is noted that the resource pool means a time-frequency resource group including a predetermined amount (number) of time-frequency resources.

First, the communication resource pool will be described with reference to FIG. 15. The communication resource pool includes an SC resource pool (SC Pool) that is a pool of a radio resource usable for transmitting and receiving sidelink control information (SCI) and a data resource pool (DataPool) that is a pool of a radio resource usable for transmitting and receiving D2D communication data.

The UE 100 selects a radio resource used for transmitting data, from among time-frequency resources in a data resource pool (data region) arranged periodically in a time direction. For example, if a timing at which identical data is transmitted in the time direction is set at random, the UE 100 randomly selects four subframes from among first-half time-frequency resources in the data region and randomly selects four subframes from among latter-half time-frequency resources in the data region. The UE 100 uses the selected eight subframes to transmit data. Alternatively, the UE 100 may use the four subframes selected from among the first-half time-frequency resources in the data region to repeatedly transmit data, and may use the four subframes selected from among the first-half time-frequency resources in the data region to repeatedly transmit another data.

In FIG. 15, "F" indicates the frequency direction, and "t" indicates the time direction. (a) is an offset indicating a position at which the SC resource pool is started (SC start position offset) in a radio frame. A range of the SC start position offset is from 0 to 10239 subframes. (b) indicates a repeat period of the communication resource pool in the radio frame. "40 subframes", "80 subframes", "160 subframes" or "320 subframes" is applied to the repeat period. (c) is an offset indicating a position at which the data resource pool is started in the radio frame (data start position offset). A range of the data start position offset is from 0 to 10239 subframes.

The UE 100 selects a time-frequency resource for transmitting information indicating a position of a time-frequency resource for data transmitted by D2D communication (schedule assignment (SA)), from among time-frequency resources in an SC resource pool arranged periodically in the time direction.

Next, an operation state according to the second embodiment will be described with reference to FIG. 16. The UE 100 generates, after step S101, sidelink control information (SCI) including control information for Discovery (for D2D discovery procedure) and data for Discovery (step S112).

Here, the SCI will be described with reference to FIG. 17 and FIG. 18. First, as illustrated in FIG. 17, SCI (first SCI)

includes a UEID (UE identifier) and an MCS. The UEID is ID of a transmission target of an SA (target ID). For example, the UEID is an 8-bit bit string. A first one bit of the UEID may be information indicating whether or not user data is transmitted by broadcast. As a result, if the user data of which the position is indicated by the SA is not user data for broadcast and is not data destined for the UE 100, the UE 100 that receives the SA can delete, without decoding, such data.

The MCS indicates a modulation and coding scheme (MCS) of transmitted data. For example, the MCS is a 5-bit bit string.

Discovery identification information indicates that data carried in a data pool of the communication resource pool is used for a D2D discovery procedure. The Discovery identification information is 1-bit information. The Discovery identification information may be indicated by: "1" if the data carried in the data pool of the communication resource pool indicates that it is used for a D2D discovery procedure; otherwise, it may be indicated by "0".

In FIG. 16, after step S112, the UE 100 determines a time-frequency resource (radio resource) in the SC resource pool to perform radio transmission of the SCI generated in step S112. Furthermore, the UE 100 determines the time-frequency resource (radio resource) in the data resource pool to perform radio transmission of the data for Discovery generated in step S112. Thereafter, the UE 100 uses the determined radio resource to transmit the SCI and the data for Discovery (step S113).

The UE 100 at the reception side which received the SCI and the data for Discovery transmitted in step S113 recognizes Discovery identification information indicated by the SCI. The reception side UE 100 understands the meaning indicated by the Discovery identification information to execute subsequent processes.

First Modification of Second Embodiment

The above-described second embodiment indicated the example for including the Discovery identification information in the SCI. The Discovery identification information in this case is explicit information. On the other hand, in a first modification of the second embodiment, as illustrated in FIG. 18, SCI (second SCI) does not include the Discovery identification information. In the first modification of the second embodiment, a UEID in the SCI (a "Group destination ID" in FIG. 18) is defined as a UEID dedicated to Discovery transmission. In this case, the UEID dedicated to Discovery transmission indicates that a time-frequency resource for data indicated by the SCI is used for Discovery. The UEID dedicated to Discovery transmission in this case may be regarded as the explicit information. It is noted that the first SCI described above and the second SCI indicated in the description of the present example may be separately used where appropriate.

Second Modification of Second Embodiment

Furthermore, there are examples other than the second embodiment and the first modification of the second embodiment described above. For example, in a "Modulation and coding scheme" field indicated in FIG. 18, information indicating a specific MCS dedicated to Discovery suitable for Discovery transmission (a MCS that can reserve a relatively low rate in a plurality of MCSs) is stored. The specific MCS in this case is set to distinguish from an MCS for data transmission. It is noted that the specific MCS indicates that a time-frequency resource for data is implicitly used for Discovery.

Third Modification of Second Embodiment

Furthermore, in addition to the above-described examples, if a rule in which the transmission of the D2D discovery signal is permitted in a certain communication resource pool in the DTC scenario of the D2D proximity service is pre-configured, the UE 100 at the transmission side may use a time-frequency resource in the certain communication resource pool to transmit the data for Discovery. In this case, the UE 100 at the reception side can recognize the data received by a predetermined time-frequency resource in the certain communication resource pool as data for Discovery. In this case, a Pre-configured parameter indicating whether or not there is such rule described above may be regarded as implicit information.

Summary of Second Embodiment

In the second embodiment, the first modification, and the second modification thereof, as described above, the UE 100 transmits SCI explicitly or implicitly indicating that a time-frequency resource for data is used for Discovery. In this case, the UE 100 at the reception side can understand that the time-frequency resource for the data indicated by the received SCI is used for Discovery. Thus, the D2D discovery procedure is efficiently performed among plurality of user terminals in DTC scenario out of coverage.

Other Embodiments

Although contents in the first embodiment and the second embodiment described above may each be executed separately, the first embodiment is an operation in the MAC layer; the second embodiment is an operation in a layer lower than the MAC layer, and thus, may be executed in combination with both of the embodiments.

The contents in first embodiment and the second embodiment described above are carried out in the "out of coverage" scenario, but may be carried out in a "partial coverage" scenario.

In the embodiments described above, although an LTE system is described as an example of a mobile communication system, the present application is not limited to the LTE system, and may be applied to a system other than the LTE system.

CROSS REFERENCE

The entire content of Japanese Patent Application No. 2015-081202 (filed on Apr. 10, 2015) is incorporated in the present specification by reference.

INDUSTRIAL APPLICABILITY

The present application is useful in the field of communication.

The invention claimed is:
1. A user terminal used in a mobile communication system configured to support a Device to Device proximity service (D2D ProSe) including at least one of a D2D discovery procedure and a D2D communication, the user terminal comprising:

a controller including a processor and a memory coupled to the processor, wherein the processor is configured to execute processes of:

transmitting a message for the D2D discovery targeted to another user terminal out of a cell coverage, by using a radio resource in a pre-configured resource pool for the D2D ProSe, wherein the message includes identification information indicating that data carried by the message is used for the D2D discovery procedure, not used for the D2D communication, the data is data in a Medium Access Control (MAC) layer, the identification information is constituted in a first field in a MAC subheader, the MAC subheader constitutes, in a second field, first extended information indicating whether or not the data is last data used for the D2D discovery procedure, the MAC subheader constitutes, for D2D data transmission from the user terminal to a specific user terminal, a third field indicating identification information of the user terminal, and a fourth field indicating identification information of the specific user terminal, and the MAC subheader further constitutes, in a fifth field, second extended information indicating whether or not the third field and the fourth field exist.

2. The user terminal according to claim 1, wherein the MAC subheader sets an octet number of the fourth field to be larger than an octet number of a sixth field constituted when the D2D discovery procedure using the D2D data resource is not executed, and the sixth field constitutes identification information of a user terminal to which data is transmitted.

3. The user terminal according to claim 1, wherein the data is data carried in a layer lower than a MAC layer, and the identification information is carried in a time-frequency resource region for control information in a resource pool for the D2D communication.

4. The user terminal according to claim 3, wherein the identification information is explicit information.

5. The user terminal according to claim 3, wherein the identification information is information implicitly indicated by a specific modulation and coding scheme (MCS).

6. A control method in a user terminal used in a mobile communication system configured to support a Device-to-Device proximity service (D2D ProSe) including at least one of a D2D discovery procedure and a D2D communication, the control method comprising:

transmitting a message for the D2D discovery targeted to another user terminal out of a cell coverage, by using a radio resource in a pre-configured resource pool for the D2D ProSe, wherein the message includes identification information indicating that data carried by the message is used for the D2D discovery procedure, not used for the D2D communication, the data is data in a Medium Access Control (MAC) layer, the identification information is constituted in a first field in a MAC subheader, the MAC subheader constitutes, in a second field, first extended information indicating whether or not the data is last data used for the D2D discovery procedure, the MAC subheader constitutes, for D2D data transmission from the user terminal to a specific user terminal, a third field indicating identification information of the user terminal, and a fourth field indicating identification information of the specific user terminal, and the MAC subheader further constitutes, in a fifth field, second extended information indicating whether or not the third field and the fourth field exist.

\* \* \* \* \*